United States Patent Office 2,868,841
Patented Jan. 13, 1959

2,868,841

PURIFYING 2,2'-THIOBIS(POLYHALOPHENOLS)

William A. Garlette, Jr., Brentwood, Mo., and Kenneth L. Godfrey, St. Albans, W. Va., assignors to Monsanto Chemical Company, St. Louis, Mo., a corporation of Delaware No Drawing. Application May 31, 1956
Serial No. 588,233

2 Claims. (Cl. 260—609)

This invention relates to purifying 2,2'-thiobis-(polyhalophenols) containing halogen substituents in both the 4- and 6-positions. The invention particularly relates to the purification and recovery of the condensation products of 2,4- and 2,4,5-halogen substituted phenols with sulfur halides to produce the corresponding 2,2'-thiobis phenols, a valuable class of antiseptics. Examples of phenol reactants comprise 2,4-dichlorophenol, 2,4-dibromophenol, 2,4,5-trichlorophenol and 2,4,5-tribromophenol.

For use as antiseptics, particularly as soap antiseptics, the products are required in a high state of purity. Odor and staining of the soap are highly objectionable and it was found that even trace quantities of certain impurities inherently present or produced during manufacture increase the odor and staining enormously. Unfortunately, these impurities are held very tenaciously and cannot be removed by recrystallization. However, it has now been discovered that addition of mineral acid to the crude reaction mixture diminishes contamination, requires odor, produces a product having less tendency to stain soaps, increases the rate of filtration, aids washing and effects other improvements.

Although the invention is not limited to any theory for the benefits observed, small amounts of metal contaminants are believed to be the impurities primarily responsible for discoloration and other difficulties and to be removed by the mineral acid. Phenols containing halogen in both the ortho and para positions do not condense readily with sulfur halides and aluminum chloride catalyst is required for their formation. After addition of water to quench the catalyst, the acidic medium would be expected to keep acid soluble impurities in the aqueous phase but surprisingly this is apparently not the case.

Before condensation the polyhalophenol and sulfur halide are preferably passed through clarifying filters to remove any iron or rust particles. Condensation is then effected by heating at 50–90° C. in a water immiscible solvent inert to the reactants and to aluminum chloride. The amount of aluminum chloride will usually be 2–200 pounds per pound mole of halophenol, preferably 2.5–15 pounds. During the reaction hydrogen halide is evolved. After completing the condensation dilute mineral acid is admixed with the crude reaction mixture to produce an aqueous phase, an organic phase and a solid phase. The batch is then heated and stirred for a short time and cooled. After settling it is ready to be filtered. The discovery of acid filtration not only improved product quality by reducing color and odor of the product and lessening discoloration of soap but led to shortened batch cycles and shorter contact time with materials of construction during filtration because aluminum salts which hinder clarification filtration are effectively removed.

As an example of the process, 163 parts by weight of 2,4-dichlorophenol, crystallizing point 41.5–42° C., was charged as a melt into a glass or glass-lined reactor fitted with stirrer and condenser. To the melt was added 5 parts by weight of anhydrous aluminum chloride and the mixture stirred while heating to 68° C. The temperature was then raised to 70° C. and a solution of 56.7 parts by weight of sulfur dichloride in 290 parts by weight of perchloroethylene added at a uniform rate over a 1.5 hours period. Agitation and temperature were maintained for an additional hour. The reaction mixture was then quenched by admixing with 125 parts by weight of dilute hydrochloric acid (3.5–4.0%). The slurry was then heated and stirred to 90° C. for about 15 minutes, cooled to 30–40° C. and after standing for about 15 minutes, filtered and the solid product washed with perchloroethylene and water. The cake from the acid filtration was slurried in perchloroethylene and water and the mixture carefully neutralized with 10% sodium bicarbonate solution to pH 6.0. The water layer was decanted, the residue washed twice with water and part of the perchlorethylene distilled off in order to effect dehydration and the product recovered from the residue. Where desired the product may be recrystallized from monochlorobenzene or perchlorethylene. For example, after dehydrating as described, additional perchlorethylene may be added and the hot perchlorethylene solution filtered. The product crystallizes from the filtered solution upon cooling. It is a white powder, M. P. 187° C.

Sulfur monochloride may be substituted for sulfur dichloride or one of the sulfur bromides used. These reagents yield the same products in essentially equivalent yields.

Halogenated hydrocarbon solvents are preferred for carrying out the condensation. Further examples are carbon tetrachloride, tetrachloroethane and monochlorobenzene.

It is intended to cover all changes and modifications of the examples of the invention herein chosen for purposes of disclosure which do not constitute departures from the spirit and scope of the invention.

What is claimed is:

1. In the process of preparing phenol sulfides by heating a polyhalogenated phenol in which the halogen is selected from a group consisting of chlorine and bromine containing one ortho position free and halogen in at least the ortho and para position with a sulfur halide the halogen of which is selected from a group consisting of chlorine and bromine in an organic solvent inert to the reactants in the presence of aluminum chloride within the range of 2.5–15 pounds per pound mole of halophenol, the steps which comprise admixing mineral acid with the crude reaction mixture and filtering the acidified reaction mixture.

2. In the process of preparing phenol sulfides by heating 2,4-dichlorophenol with a sulfur chloride in an organic solvent inert to the reactants in the presence of aluminum chloride within the range of 2.5–15 pounds per pound mole of halophenol, the steps which comprise admixing dilute hydrochloric acid with the crude reaction mixture, heating and filtering the acidified reaction mixture.

References Cited in the file of this patent
FOREIGN PATENTS 583,055     Germany _____ Aug. 28, 1933